May 22, 1934.  A. OLSEN  1,959,838
VALVE GRINDING TOOL
Filed May 2, 1932
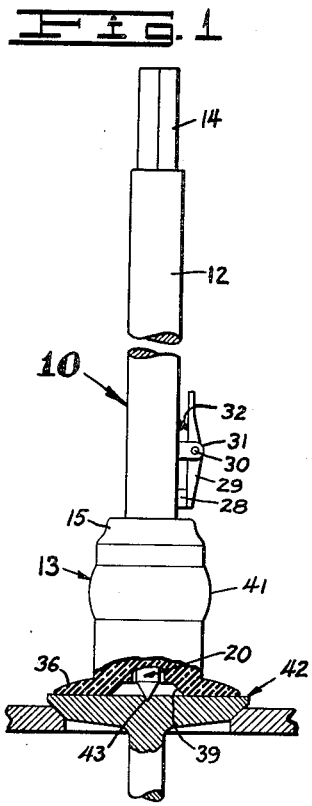
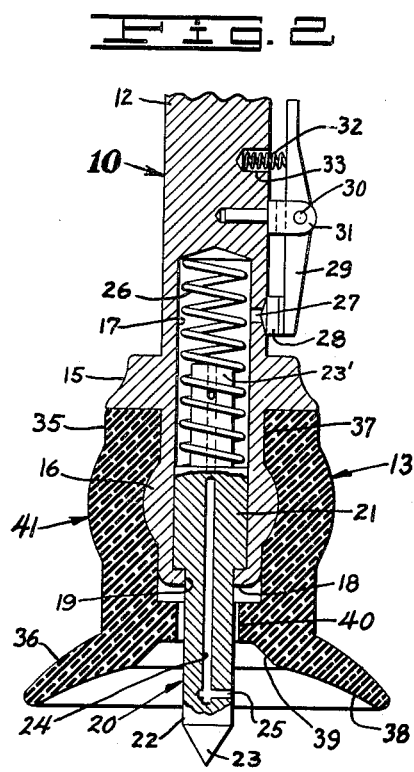
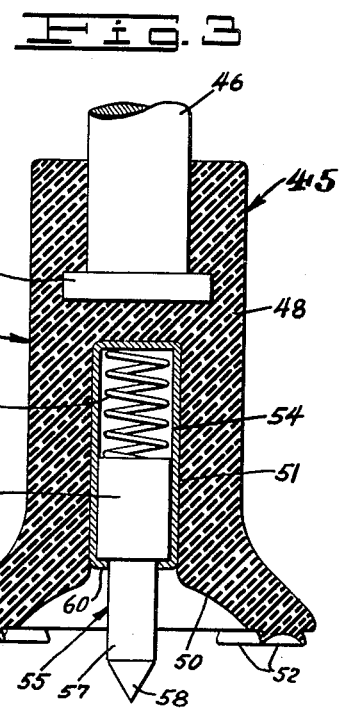
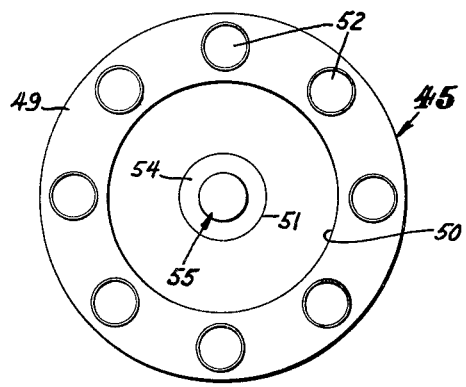
INVENTOR.
A. OLSEN.
BY 
ATTORNEY.

UNITED STATES PATENT OFFICE 1,959,838

VALVE GRINDING TOOL

Arthur Olsen, San Bernardino, Calif.

Application May 2, 1932, Serial No. 608,747

3 Claims. (Cl. 51—29)

This invention relates to improvements in valve grinding tools.

The general object of the invention is to provide a valve grinding tool including an improved suction cup for engaging the valve.

Another object of the invention is to provide means for centering the tool on the work and means to prevent lateral movement of the tool relative to the work.

A further object of the invention is to provide a valve grinding tool including a suction cup for engaging the valve and means to break the vacuum in the suction cup to release the device from the valve.

A still further object of the invention is to provide a valve grinding tool including a plurality of suction cups for engaging the valve.

Other objects and advantages of this invention will be apparent from the following description taken in connection with the accompanying drawing wherein:

Fig. 1 is a side elevation of my improved valve grinding tool showing it operatively engaging a valve to be ground.

Fig. 2 is an enlarged fragmentary central section through the tool shown in Fig. 1.

Fig. 3 is a fragmentary central section through a modified form of my invention, and Fig. 4 is a bottom plan view of the device shown in Fig. 3.

Referring to the drawing by reference characters I have indicated my improved valve grinding tool generally at 10. As shown the device 10 comprises a metal shaft 12 having a rubber head 13 mounted thereon adjacent one end. The end of the shaft 12 opposite the head 13 may be of any desired form suitable for rotating it or a tool engaging portion may be provided as shown at 14.

Adjacent the end of the shaft 12 opposite the portion 14 I provide an enlarged collar 15 and intermediate the adjacent end of the shaft and the collar 15 I provide an enlarged bulbous portion 16 on the shaft. Opening through the end of the shaft adjacent the portion 16 I provide a recess 17. The end of the wall defining the recess is spun over as at 18 thus providing an aperture 19.

Positioned in the recess 17 I provide a plunger 20 which includes an enlarged head 21 and a reduced shank 22 which is pointed at its free end as at 23. The head 21 of the plunger 20 is operable in the recess 17 and is retained therein by the washer 18 and the reduced shank 22 is operable through the aperture of the washer 18. The plunger has a stop member 23' thereon.

Opening through the free end of the head 21 and extending towards the point 23 I provide a recess 24 which communicates with a transverse recess 25 which opens through the side of the shank 22 at a point slightly above the pointed portion 23.

Positioned in the recess 17 between the end thereof and the free end of the plunger head 21 I provide a coiled spring 26 which resiliently urges the head 21 towards the washer 18.

Communicating with the recess 17 and opening through the side of the shaft 12 I provide an aperture 27. As shown the aperture 27 is adapted to be closed by a valve member 28 which is preferably made of rubber and is mounted on a bar 29 adjacent one end thereof. The bar 29 is pivotally mounted intermediate its length as at 30 on a bearing member 31 which is mounted on the shaft 12. Adjacent the end of the bar 29 opposite the valve member 28 I provide a coiled spring 32 which is positioned in a recess 33 in the shaft 12 and engages the bar 29. The spring 32 is adapted to resiliently urge the valve member 28 into air tight engagement with the shaft 12 so that no air can pass through the aperture 27 into the recess 17.

As shown the head 13 includes an annular body portion 35 and an enlarged end portion 36. Opening through the end of the body 35 opposite the enlarged portion 36 I provide an annular recess 37 and in the face of the enlarged portion 36 I provide a saucer-shaped recess 38 which communicates with a reduced recess 39. The body 35 further includes an intermediate wall having an aperture 40 which communicates with the recess 37 and the recess 39 and is larger in cross section than the reduced shank 22 of the plunger 20.

When the device 10 is operably assembled the head 13 is positioned on the shaft 12 adjacent the bulbous portion 16 with the free end of the body engaging the collar 15. As the body 35 is positioned on the shaft 12 the bulbous portion 16 of the shaft expands the body 35 as at 41 thereby causing the body 35 to tightly engage the shaft and form an air tight seal between the shaft and the body 35. When the head 16 is operatively positioned on the shaft 12 the reduced shank 22 of the plunger 20 is positioned in the head aperture 40 and is free to move therein.

As shown in Fig. 1 an automobile engine valve such as the valve indicated at 42 usually includes a central recess 43 in its top surface.

In use the operator places the pointed end of the plunger 20 in the center recess 43 of the valve and then moves the enlarged end 36 of the head 13 into engagement with the valve. Upon further downward movement of the device the portion 36 is flattened as shown in Fig. 1 thereby expelling the air from the recess 38 whereupon the head 13 acts in the usual manner of a suction cup to retain the device in engagement with the valve.

With the usual type of valve tools which include suction cups for fastening them to the valve, the suction cups slide on the valves when a film of oil or water is on the valve top thereby making it difficult to retain the tool correctly centered and to retain it in engagement with the valve. With my improved device 10 the plunger 20 assures of absolute centering of the tool on the valve and prevents slipping of the head on the valve even though the valve top has a film of oil or water thereon.

When it is desired to remove the device 10 from a valve the operator swings the bar 29 about its pivot 30 against the action of the spring 32 thereby moving the valve member 28 out of engagement with the shaft whereupon air may pass through the aperture 27 into the recess 17 and thence through the plunger apertures 24 and 25 into the recess 38 whereupon the device may be readily removed from the valve. In some cases the valve 28 may be omitted.

In Figs. 3 and 4 I have indicated a modified form of my invention generally at 45. As shown the device 45 includes a metal operating shaft 46 and a rubber head member 47. The head member 47 includes a body portion 48 which merges into an enlarged portion 49 at one end. In the portion 49 I provide a reduced recess 50 which communicates with a further reduced recess 51. On the face of the enlarged portion 49 intermediate the periphery thereof and the recess 50 I provide a plurality of spaced suction cup members 52.

Adjacent one end of the shaft 46 I provide an enlarged head 53 which is embedded in the body 48 when the head 47 is being molded.

Positioned in the recess 51 I provide a metal tube 54 which is open at the end adjacent the recess 50 and closed at the opposite end. Positioned in the tube 54 I provide a plunger 55 which includes a head portion 56 and a reduced shank 57 which is pointed as at 58. Also positioned in the tube 54 between the closed end thereof and the free end of the plunger head 56 I provide a coiled spring 59 which is adapted to resiliently urge the plunger towards the recess 50. When assembling the device the spring and the plunger head are positioned in the tube 54 and then the sides of the tube adjacent the open end thereof are spun inwardly to form a flange 60 which retains the plunger head 56 in the tube 54.

In operation the operator positions the pointed end 58 of the plunger in the center recess of a valve and then moves the head 47 into engagement with the valve and firmly presses it downward whereupon the air is expelled from the suction cups 52 which thereafter retain the device in tight engagement with the valve. The plunger 55 of the device 45 like the plunger 20 of the device 10 prevents sliding of the suction cups on the valve should the valve top have a film of oil or water thereon.

From the description above it will be apparent that I have provided a novel valve grinding tool which is simple in construction and highly efficient in use.

Having thus described my invention, I claim:

1. In a valve grinding tool, a shaft, an enlarged collar adjacent one end of said shaft, an enlarged portion on said shaft intermediate said collar and said adjacent end, a recess in said shaft opening through said adjacent end, a plunger, said plunger including a head and a reduced shank having a pointed end, said head being positioned in said shaft recess, means to retain said plunger head in said shaft recess, a coiled spring positioned in said shaft recess between the end thereof and the free end of said plunger head, a rubber head member on said shaft, said head including a body portion and an enlarged end portion, a recess in the face of said end portion to form a suction cup, there being a reduced recess communicating with said suction cup recess, said body having a recess open through the end thereof opposite said suction cup recess, said body having an aperture communicating with said suction cup recess, said shaft being positioned in said body recess with the free end of said body engaging said shaft collar, said enlarged portion of said shaft when said shaft is positioned in said body recess expanding said head body portion and thereby forming an air tight seal between said body and said head, said plunger shank extending through said rubber head recess to a point beyond said rubber head.

2. In a valve grinding tool, a shaft having a recess therein opening out of one end thereof, said shaft having an internal flange partially closing said recess, said flange having a circumferential inner wall, a collar on said shaft intermediate the length thereof, said collar having a plane lower face, a plunger movable in said recess and including an elongated cylindrical portion fitting said recess, said plunger having a reduced shank fitting the inner wall of said flange, a spring in said recess for normally urging said plunger to an advanced position, said shank having a pointed front end, a rubber head member on said shaft, said head member including a body portion having an internal cylindrical bore the wall of which is in tight engagement with said shaft, said head member having a plane end face engaging the plane face in said collar, said head member also including an enlarged end portion, said end portion having an internal partition and including a flexible lip arranged to form a suction cup.

3. In a valve grinding tool, a shaft having an enlarged collar thereon, said shaft having a recess therein opening out of one end thereof, said shaft having an internal flange partially closing said recess, said flange having a circumferential inner wall, a plunger movable in said recess and including an elongated cylindrical portion fitting the inner wall of said flange, a spring in said recess for normally urging said plunger to an advanced position, said shank having a pointed front end, a rubber head member on said shaft, said head member including a body portion having a portion in tight engagement with said collar, said head member also including an enlarged end portion, said end portion including a flexible lip arranged to form a suction cup, said shaft having an aperture therein communicating with said recess, a valve for closing said aperture, said plunger having an aperture extending therethrough, said aperture communicating at one end with said recess and at the other end with the interior of suction cup whereby the vacuum in the suction cup can be broken by opening the valve.

ARTHUR OLSEN.